United States Patent
Tian et al.

(10) Patent No.: US 10,573,999 B2
(45) Date of Patent: Feb. 25, 2020

(54) POWER COMMUNICATION ELECTRICAL CONNECTOR

(71) Applicant: Haoxiang Electric Energy (Kunshan) Co., Ltd., Kunshan, Jiangsu (CN)

(72) Inventors: Yu Tian, Jiangsu (CN); Wenyan Jiang, Jiangsu (CN)

(73) Assignee: Haoxiang Electric Energy (Kunshan) Co., Ltd., Kunshan, Jiangsu (CN)

( * ) Notice: Subject to any disclaimer, the term of this patent is extended or adjusted under 35 U.S.C. 154(b) by 295 days.

(21) Appl. No.: 15/673,195

(22) Filed: Aug. 9, 2017

(65) Prior Publication Data
US 2017/0338597 A1   Nov. 23, 2017

(30) Foreign Application Priority Data

Nov. 22, 2016 (CN) ............................ 2016 1 1046229
Nov. 22, 2016 (CN) ............................ 2016 1 1046230

(51) Int. Cl.
| H01R 13/66 | (2006.01) |
| H01R 13/6464 | (2011.01) |
| H01R 24/78 | (2011.01) |
| H01R 13/652 | (2006.01) |
| H01R 4/66 | (2006.01) |
| H01R 13/53 | (2006.01) |
| G06K 19/077 | (2006.01) |
| G06F 1/26 | (2006.01) |
| H01R 13/04 | (2006.01) |
| H02J 7/00 | (2006.01) |

(52) U.S. Cl.
CPC .......... *H01R 13/6464* (2013.01); *H01R 4/66* (2013.01); *H01R 13/53* (2013.01); *H01R 13/652* (2013.01); *H01R 13/6675* (2013.01); *H01R 24/78* (2013.01); *G06F 1/26* (2013.01); *G06K 19/07743* (2013.01); *H01R 13/04* (2013.01); *H01R 13/66* (2013.01); *H02J 2007/0062* (2013.01)

(58) Field of Classification Search
USPC .......................................... 361/119; 307/130
See application file for complete search history.

(56) References Cited

U.S. PATENT DOCUMENTS

| 8,928,189 B2 * | 1/2015 | Toivola ............... G06F 13/4081 307/130 |
| 2005/0039060 A1* | 2/2005 | Okayasu ................. G06F 1/266 713/300 |
| 2008/0150512 A1* | 6/2008 | Kawano .................. G06F 1/266 323/351 |

(Continued)

*Primary Examiner* — Danny Nguyen

(57) ABSTRACT

A power communication electrical connector is provided, comprising: a plug and a socket which are matched and plugged for connecting a power source circuit or a high-power load circuit; wherein power source connectors and the signal connectors are respectively provided on both the plug and the socket, the power source connectors are for connecting a power source of the power source circuit or a high-power load of the high-power load circuit; the signal connectors are for connecting an external chip of the power source circuit or an external chip of the high-power load circuit, wherein a power ground of the power source connectors the a signal ground of the signal connectors are separately provided. In addition, an anti-spark power communication electrical connector is further provided.

18 Claims, 2 Drawing Sheets

(56) References Cited

U.S. PATENT DOCUMENTS

2009/0198841 A1* 8/2009 Yoshida .............. G06F 13/4295
710/16
2015/0326008 A1* 11/2015 Baurle ................. H02H 1/0084
361/87

* cited by examiner

POWER COMMUNICATION ELECTRICAL CONNECTOR

CROSS REFERENCE OF RELATED APPLICATION

The present application claims priority under 35 U.S.C. 119(a-d) to CN 201611046229.4, filed Nov. 22, 2016, and 201611046230.7, filed Nov. 22, 2016.

BACKGROUND OF THE PRESENT INVENTION

Field of Invention

The present invention relates to the technical field of electrical plugging, and more particularly to a power communication electrical connector

Description of Related Arts

Plugs and sockets are generally paired for use. Generally, the plugs and the sockets are classified as plugs and sockets connected as a power source or plugs and sockets connected for communication. The general communication plug or socket can only achieve the communication function of small signals and is difficult to be compatible with heavy current connecting ends, and particularly difficult to be compatible with power source connecting ends fed by high-power load. The current break of the high power load current under the conditions of power up or power failure and etc will have an impact on signal communications of the communication ends. There are interferences among the signals and the signals are not capable of being outputted completely or in normal, and the electrical performances are impacted and become unstable. Thus, the plug and the socket which is connected as a power source and the plug and the socket which is connected for communication are provided separately, which causes problems that the plug is not convenient and the plug parts are in a large number and in a mess In addition, if the plug and the socket connecting as a power source and the plug and the socket for communication are put together, a general measure is plugging the rigid connection. All the high power loads must have large capacity energy storage freewheeling capacity and corresponding spark capacitor. The rigid connection plug is not capable of preventing the energy storage capacitor in the circuit form discharging and generating spark during the plug process and a corrected power-up sequence cannot be ensured, the communication interface is easy damaged and the integrity of the communication signal is damaged.

At present, the anti-spark power communication plug or socket achieves the linear function of avoiding spark only by structure. Generally, a limit switch is provided in the core of the plug. When the plug is inserted in an upper section of the socket, the limit switch is in a shutdown state, and the load current cannot strike sparks. Only when the plug is inserted in a right place, can the top rob in the socket supports the switch handle of the limit switch to open the switch for electrifying, so as to avoid the spark phenomenon when the plug is inserted; and when the plug is plugged out, perform a reverse operation as follows. The top rob is firstly separated from the switch handle, the limit switch is off, the power source is cut off, and the spark is prevented when the plug is out. However, the long-term operation of the mechanism structure will make the structure loose and unstable, and increase the internal receiving space of the plug and the socket, and furthermore, communication function is not possessed, and data communication is not capable of achieving.

SUMMARY OF THE PRESENT INVENTION

The technical problem to be solved by the present invention is to provide a power communication electrical connector, which is capable of avoiding the impact of high power load current break on signal communication to ensure the integrity of the product communication signal, so that the electrical performance of circuit of the whole equipment is more stable.

Accordingly, in order to solve the problems mentioned above, the present invention provides a power communication electrical connector, comprising: a plug and a socket which are matched and plugged for connecting a power source circuit or a high-power load circuit;

wherein power source connectors and signal connectors are respectively provided on both the plug and the socket, the power source connectors are for connecting a power source of the power source circuit or a high-power load of the high-power load circuit; the signal connectors are for connecting an external chip of the power source circuit or an external chip of the high-power load circuit;

wherein a power ground of the power source connectors the a signal ground of the signal connectors are separately provided.

According to a preferred embodiment of the present invention, the power source connectors comprise a power source end, a power source ground end, a power line and a power ground line which are respectively connected with the power source end and the power source ground end; the signal connectors comprise a signal end, a signal ground end, a signal line and a signal ground line which are respectively connected with the signal end and the signal ground end.

According to a preferred embodiment of the present invention, when the plug and the socket are plugged, connections among the power source ground ends and connections among the signal ground ends are prior to connections among the power source ends and connections among the signal ends.

According to a preferred embodiment of the present invention, when the plug and the socket are plugged, connections among the power source ground ends and connections among the signal ground ends are at a same or different time; when the plug and the socket are plugged, connections among the power source ends and connections among the signal ends are at a same or different time.

According to a preferred embodiment of the present invention, an energy storage capacitor is connected between the power line and the power ground line; wherein the energy storage capacitor is provided in the plug or the socket; or in the power source circuit or the high-power load circuit.

According to a preferred embodiment of the present invention, a spark suppression resistor is connected between the signal ground line and the power ground line; the spark suppression resistor is provided in the plug or the socket; or in the power source circuit or the high-power load circuit.

According to a preferred embodiment of the present invention, when the plug and the socket are plugged, connections among the signal ground ends are prior to connections among the power source ends; connections among the power source ends are prior to connections among the power ground ends and the signal ends, in such a manner that after the signal ground ends are connected with each other and the power ground ends are connected with each other, the spark suppression resistor and the energy storage capacitor constitute a return circuit, so as to inhibit the energy storage capacitor from release a heavy current instantaneously.

According to a preferred embodiment of the present invention, connections among the power ground ends and connections among the signal ends are at a same time; or connections among the power ground end are prior to connections among the signal ends.

According to a preferred embodiment of the present invention, when the plug and the socket are plugged, contact distances among ends which are connected before are shorter than contact distances among ends which are connected afterwards.

According to a preferred embodiment of the present invention, the power source ends, the power source ground ends, the signal ends and the signal ground ends are embedded in or extended out of the plug or the socket.

Furthermore, another technical problem to be solved by the present invention is to provide an anti-spark power communication electrical connector which is capable of avoiding spark phenomenon, so as to prevent damaging the connector and the communication circuit.

Accordingly, in order to solve the problem mentioned above, the present invention provides An anti-spark power communication electrical connector, comprising: a power source connector and a signal connector; wherein the power source connector comprises a power end, a power ground end, and a power line and a power ground line which are respectively connected with the power end and the power ground end; the signal connector comprises a signal end, a signal ground end, a signal line and a signal ground line which are respectively connected with the signal end and the signal ground end; an energy storage capacitor is connected between the power line and the power ground line; a spark suppression resistor is connected between the signal ground line and the power source ground line;

wherein when connectors are matched or plugged, electrical connections among the signal ground ends are prior to electrical connections among the power ends; electrical connections among the power ends are prior to electrical connections among the power source ground ends and electrical connections among the signal ends, in such a manner that when electrical connections are established among the signal ground ends and among the power source ends, the spark suppression resistor and the energy storage capacitor constitutes a return circuit, so as to inhibit the energy storage capacitor from releasing a large current instantaneously.

According to a preferred embodiment of the present invention, electrical connections among the power ground ends and connections among the signal ends are at a same time; or connections among the power ground ends are prior to electrical connections among the signal ends.

According to a preferred embodiment of the present invention, the power source connector is for connecting an external ship of a power source of a power source or an external chip of a high-power load circuit.

According to a preferred embodiment of the present invention, more earlier is the electrical connections among ends when the connectors are matched and plugged, more shorter is contact distances among the ends.

According to a preferred embodiment of the present invention, the ends which are matched and connected comprise a concave end and a convex end; convex end which is firstly electrically connected has a longer extended length; the convex end is telescopic; the convex end is compressed after contacting the concave end, so as to make other convex ends contacted with each other one by one; or, the convex end which is electrically connected has a longer extended length and the concave end is deeper; the convex end is capable of inserting downwards continuously after contacting the concave end, so as to make other convex ends contacted with each other one by one.

According to a preferred embodiment of the present invention, the connector is the plug which is matched and connected with the socket, or a socket which is matched and connected with the plug; or the plug and the socket which are matched and plugged.

According to a preferred embodiment of the present invention, the energy storage capacitor is provided in the plug or the socket; or provided in the power source circuit or the high-power load circuit.

According to a preferred embodiment of the present invention, the spark suppression resistor is provided in the plug or the socket; or provided in the power source circuit or the high-power load circuit.

According to a preferred embodiment of the present invention, the power end, the power ground end, the signal end, the signal ground end are embedded in or extended out of the plug or the socket.

According to a preferred embodiment of the present invention, in the connectors, the signal ground line and the power ground line are provided separately.

By adopting the technical solution mentioned above, compared with the conventional art, the present invention has following beneficial effects as follows.

The power source connectors and signal connectors are integrated together, one-time plug can achieve power connection and communication connection at the same time, and the operation more convenient. In the connection and power up process of each of the ends, by a specific power up sequence, a return circuit is firstly constituted between the spark suppression resistor and the energy storage capacitor to limit the storage capacitor release a large current instantaneously afterwards to avoid the spark phenomenon, so as to protect the connectors and the communication circuit connected therewith and prolong the service life of the connector.

The plug, the socket, the power ground and the signal ground are separately provided, so as to avoid the impact of the mutation of the high-power load current to the signal ground and the signal communication, avoid the signal crosstalk, so as to ensure the integrity and correctness of the communication signal, in such a manner that the circuit of the device comprising the plug and the socket is more stable, and the performance of the product is more stable, so as to overcome the incompatible problem.

These and other objectives, features, and advantages of the present invention will become apparent from the following detailed description, the accompanying drawings, and the appended claims.

DETAILED DESCRIPTION OF THE PREFERRED EMBODIMENT

Figure 1:
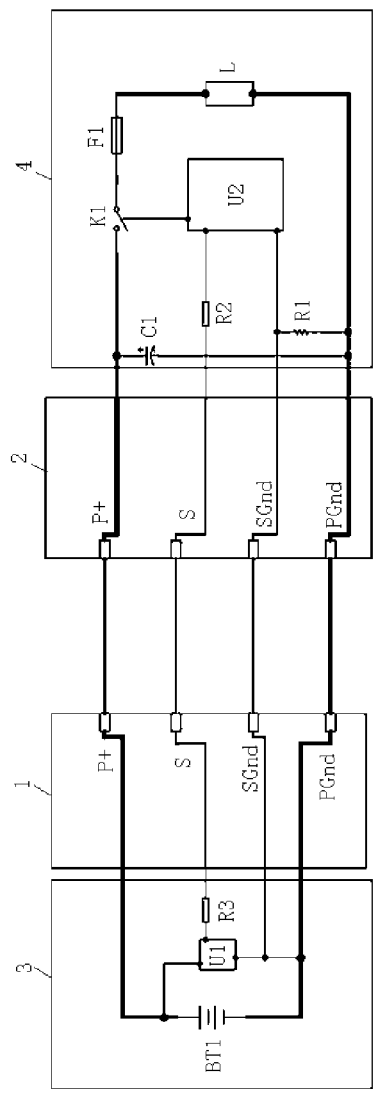
FIG. 1 is a structural sketch view of a power communication electrical connector according to a preferred embodiment of the present invention.

In order to make the object, characteristic and advantage mentioned above more apparent and easy understanding, further description of the present invention is illustrated combining with the accompanying drawings and the preferred embodiments.

Embodiment 1

A plurality of specific details is illustrated as follows to facilitate adequate understanding of the present invention. However, one skilled in the art will understand that the embodiment of the present invention as shown in the drawings and described above is exemplary only and not intended to be limiting.

Referring to FIG. 1, according to a preferred embodiment of the present invention, a power communication electrical connector comprises a plug and a socket; wherein the plug and the socket are matched and inserted with each other, one of the plug and the socket is connected with a power source circuit, and the other of the plug and the socket is connected with a high-power load circuit. Connection of the plug and the socket is capable of simultaneously realizing a power supply function and a communication function. In the FIG. 1, reference number 1 refers to a plug or a socket, and reference number 2 refers to a socket or a plug. The power source circuit 3 comprises a power source BT1 and a first external chip U1. The high-power load circuit 4 comprises at least a high-power load and a second external chip U2. The power source circuit 3 and the high-power load circuit 4 can be respectively provided on a cooper clad laminate. The first external chip U1 and the second external chip can be embodied as a MCU chip, but are not limited to the MCU chip, other chips with signal processing function can also be adopted. By connections among signal connectors of the plug and the socket, the first external chip U1 and the second external chip U2 achieve electrical connection communication. By connections among power source connectors of the plug and the socket, the power source BT1 achieves connecting with the high-power load circuit 3, and supplying electricity for the high-power load circuit 3.

Both the plug and the socket have power source connectors and signal connectors provided thereon. Understandably, when the plug and the socket are connected by inserting, power source connectors of the pug and the socket are matched and connected; and signal connectors of the plug and the socket are matched and connected. The power source connectors are used for connecting the power source BT1 of the power source circuit 3 or a high-power load L of the high-power load circuit 4; for example (but not limited to), the power source connectors are connected with the power source of the power source circuit 3; the power source connectors of the socket are connected with the high-power load L of the high-power load circuit 4; the signal connectors are for connecting the first external chip U1 of the power source circuit 3 of the second external chip U2 of the high-power load circuit; or for example (but not limited to), the signal connectors of the plugs are connected with the first external chip U1 of the power source circuit, the signal connectors of the socket is connected with the external chip U2 of the high-power load circuit 4. A power ground of power source connectors and the signal ground of the signal connectors are separately provided and no longer on a same ground. In the plug and the socket, the power ground and the signal ground can be separated or insulated on the line or in arrangement.

According to the preferred embodiment of the present invention, the plug and the socket integrate the power source connectors and the signal connectors together, and can be operated more conveniently by one-time plug. In addition, the power source ground and the signal ground of the plug and the socket are provided separately to avoid impact of high-power load current break on the signal ground or signal communication, avoid signal crosstalk of each other, so as to ensure the integrity and correctness of communication signals, in such a manner that a circuit of an entire device containing the plug and the socket has a more stable electrical performance, product performance is more stable to overcome a problem of incompatible.

According to another preferred embodiment of the present invention, the power source connector comprises: a power terminal P+ and a power ground end PGnd, a power line and a power ground line which are respectively connected with the power end P+ and the power ground end PGnd. The signal connectors comprise a signal end S and a signal ground end SGnd, a signal line and a signal ground line which are respectively connected with the signal end S and the signal ground end SGnd. The power end P+, the power ground end PGnd, the signal end S and the signal ground end SGnd of the plug are respectively matched and connected with the power end P+, the power ground end PGnd, the signal end S and the signal ground end SGnd of the socket. These ends can be plugged at one time, and the operation is more convenient and quickly. Selectively, when an amount of the signal end S of the plug or the socket is one, an amount of the signal line connecting the signal end S can be more than one. Of course, the amount of the signal end S is not limited to one.

According to a preferred embodiment of the present invention, when the plug and the socket are connected by inserting, connections among the power source ground ends PGnd, connections among the signal ground ends SGnd are prior to connections among the power source ends P+ and connections among the signal ends S. Connections among the power source ground ends PGnd can be prior to or after connections among the signal ends S. Connections among the power source ends P+ can be prior to or after connections among the signal ends S. In the preferred embodiment of the present invention, connections among ends refer to electrical communication, and of course, refer to direct contact in structure as well, i.e., contact of conductive ends achieves electrical communication.

Since connections among the power source ground ends PGnd and connections among the signal ground ends SGnd are prior to connections among the power source ends P+ and connections among the signal ends S, vacancy situations in the plug, the socket, the power source circuit or the high-power load circuit are prevented, and thereby avoiding electrification connection operation of the ground ends.

Optionally, when the plug and the socket are connected by inserting, connections among the power source ends PGnd and connections among the signal ground ends SGnd are in identical or different time. When the plug and the socket are connected by inserting, connections among the power source ends P+ and connections among the signal ends S are in identical or different time.

According to another preferred embodiment of the present invention, an energy storage capacitor C1 is connected between the power line and the power ground line; wherein the energy storage capacitor C1 is provided in the plug, in the socket; or in the power source circuit 3 or the high-power load circuit 4. The energy storage capacitor C1 is for high-capacity energy storage, so as to provide current for the high-power load L. However, in general connectors, firstly, the power source ends are contacted with each other and the power source ground ends are contacted with each other, in such a manner that the energy storage capacitor C1 constitutes a return circuit with a positive charge and a negative charge of the power source, and instantly, a large current is released, and spark phenomenon is generated, and the plug, the socket and the communication circuit are easy damaging, at this time, the energy storage capacitor can be taken as a spark capacitor.

In a further embodiment of the present invention, a spark suppression resistor R1 is connected between the signal ground line and the power source ground line, wherein the spark suppression resistor R1 is provided in the plug or the socket or in the power source circuit 3, or the high-power load circuit 4.

When the plug and the socket are connected by inserting, connections among the signal ground ends SGnd are prior to connections among the power source ends P+; and connections among the power source ends P+ are prior to connections among the power ground end PGnd and connections among the signal ends S, in such a manner that when the connections are established among the signal ground ends SGnd and among the power source end P+, the spark suppression resistor R1 and the energy storage capacitor C1 constitute a return circuit, so as to prevent the energy storage capacitor C1 to release an instantaneous large current. In other words, when the plug and the socket are plugged in, the signal ground ends SGnd are electrically connected with each other firstly, and then the power source ends P+ are electrically connected with each other, and finally the power source ground ends PGnd are electrically connected with each other, and the signal ends S are electrically connected with each other.

In the process of electrifying all of the ends mentioned above, through a specific electrifying sequence, a return circuit is firstly constituted between the spark suppression resistor R1 and the energy storage capacitor C1, so as to limit an instantaneous large current afterwards by the energy storage capacitor C1 to prevent the phenomenon of spark, so as to protect the plug, the socket and the communication circuit.

Optionally, when connections among the power source ground ends PGnd are at the same time with connections among the signal ends S, or, connections among the power source ground ends PGnd are prior to connections among the signal ends S, so as to prevent current on the return circuit of the spark suppression resistor R1 and the energy storage capacitor C1 from affecting the signal line to damage the communication circuit.

When the plug and the socket are connected by inserting, contact distances among the ends which are connected firstly are shorter than contact distances which are connected afterwards, so as to ensure early and late contacts among the ends to achieve a specific electrifying sequence. During the process of one-time plug, the ends which are connected firstly are contacted with each other firstly; and the ends which are connected afterwards are contacted with each other afterwards, which is suitable for the before and after connecting manner in the preferred embodiments mentioned above, which is not illustrated in detail. As an example, specifically, the convex ends which are electrically connected earlier has a longer extended length and contact the ends of the socket earlier compared with the ends which are electrically connected later; wherein the ends on the socket can have an identical height; i.e., when the plug process is performed for a half-length, ends which are electrically connected earlier are contacted with each other, and ends which are electrically connected later are not contacted with each other. When the plug process is ended, all ends are contacted with each other. Ends with a longer extended length which may have a stretch function, are correspondingly compressed when contact ends which are matched, and finally have an identical height with other ends; or have a deeper depth compared with ends opposite to ends which have a longer extended length and have electrical connection part on a depth direction, so that the ends have a longer extended length contact the ends from a top portion, and are inserted downwards in a deeper direction by keeping contract until a depth that other ends are all contacted, of course, a deeper depth is also allowed. Of course, there are other manners to achieve the specific power up sequence, so as to ensure that the contact of ends which are electrically connected earlier does not impact the contact of ends which are electrically connected later.

According to another preferred embodiment of the present invention, the power source end P+, the power source ground end PGnd, the signal end S and the signal ground end SGnd are embedded or protruded from the plug or the socket. The plug and the socket are matched foe connecting, without any specific limitation.

Referring to FIG. 1, the communication circuit comprises an MCU chip U1 of the power source circuit 3, an MCU chip U2 of the high power load circuit 4 and corresponding connection circuit. A positive end of a power source BT1 of the power source circuit 3 is connected with the power source end P+ of the plug or the socket; and a negative end of the power source BT1 of the power source circuit 3 is connected with the power source ground end SGnd of the plug or the socket. The power source BT1 provides power for the MCU chip U1. The signal end of the MCU chip U1 of the power source circuit 3 is connected with the signal end S of the plug or the socket 1 via a resistor R3. The ground end of the MCU chip U1 of the power source circuit 3 is connected with the signal ground end PGnd of the plug or the socket 1 and further connected with the negative end of the power source BT1. The signal end of the MCU chip U2 of the high-power load circuit 4 is connected with the signal end of the plug or the socket via the resistor R2; and the ground end thereof is connected with the signal ground end of the plug or the socket 2. A first end of the load L of the high-power load circuit 4 is connected with the power source ground PGnd of the plug or the socket; and a second end thereof is connected with the power source end P+ of the plug or the socket. Optionally, a fuse F1 is connected among the power source ends P+ of the load L, the socket or the plug 2, so as to break the circuit under excessive charges. Optionally, an electric control switch K1 is connected among the power source ends P+ between the load L and the plug or the socket 2, wherein K1 is conducted and switched on/off under control of the MCU chip U2. In the FIG. 1, the spark suppression resistor R1 is connected between the power source ground end SGnd and the power source ground end PGnd of the socket or the plug 2.

Embodiment 2

In order to make the object, characteristic and advantage mentioned above more apparent and easy understanding, further description of the present invention is illustrated combining with the accompanying drawings and the preferred embodiments.

Referring to FIG. 1, according to a preferred embodiment of the present invention, an anti-spark power communication electrical connector comprises: a plug and a socket which are matched and plugged. In the FIG. 1, reference number 1 is a plug or a socket, reference number 2 is a socket or a plug; wherein the plug is connected with the power source circuit 3 and the socket is connected with a high-power load circuit 4; or alternatively, the socket is connected with the power source circuit 3 and the plug is connected with a high-power load circuit 4. Connection of the plug and the socket is capable of simultaneously achieving a power supply function and a communication function. Understandably, the anti-spark power communication can also be a plug which is for separately matching and plugging the socket; or a socket which is for separately matching and plugging the plug.

The plug and/or the socket comprise power source connectors and signal connectors; wherein the power source connectors comprise a power end P+, a power ground end PGnd; a power line and a power ground line which are respectively connected with the power end P+ and the power ground end PGnd; wherein the signal connectors comprise a signal end S and a signal ground end SGnd; and a signal line and a signal ground line which are respectively connected with the signal end S and the signal ground end SGnd.

The power end P+, the power ground end PGnd, the signal end S and the signal ground end SGnd of the plug are respectively for matching and connecting with the power end P+, the power ground end PGnd, the signal end S and the signal ground end SGnd of the socket; wherein all of the ends mentioned above can be plugged at one time and the operation is convenient and fast. Optionally, an amount of the signal line connecting with the signal end S of one plug or socket can be more than one; and of course, an amount of the signal end S is not limited to one.

An energy storage capacitor C1 is connected between the power line and the power ground line; wherein the energy storage capacitor C1 is for large capacity storage, so as to provide freewheeling for the high-power load L. However, in general connectors, the power ends are contacted with each other and the power ground ends are contacted with each other firstly, so that the energy storage capacitor constitutes a return circuit with a positive electrode and a negative electrode of the power source, so as to release a large current instantaneously, and spark phenomenon is generated, which is easy to damage the plug, the socket and the communication circuit. At the moment, the energy storage capacitor can be taken as a spark generating capacitor. Optionally, the energy storage capacitor C1 is provided in the plug or the socket; or in the power source circuit 3 or the high-power load circuit 4.

The spark suppression resistor R1 is provided between the signal ground line and the power ground line. Optionally, the spark suppression resistor R1 is provided in the plug or the socket; or provided in the power source circuit 3 or the high-power load circuit 4.

When the plug and the socket and plugged, electrical connections among the signal ground ends SGnd are prior to electrical connections among the power ground ends and the electrical connections among the signal ends S, in such a manner that after electrical connections of the signal ground ends SGnd and electrical connections of the power ends P+ are performed, so as to prevent the spark suppression resistor R1 and the energy storage capacitor C1 from constituting a return circuit to prevent the energy storage capacitor C1 from releasing a large current instantaneously. In other words, when the plug and the socket are matched and plugged, electrical connections are firstly established among the signal ground ends SGnd; then electrical connections are established among the power ends P+ of the plug and the socket; and finally electrical connections are established among the power ground ends PGnd and among the signal ends S of the plug and the socket. In the preferred embodiment of the present invention, the electrical connections among the ends refers to electrical communication; and also refers to direct contacts in structure, wherein the contacts of conductive ends achieves electrical communication.

The power source connectors and the signal connectors are integrated together, a one-time plug is capable of achieving power source connection and communication connection at the same time, and the operation is more convenient. During the process of each ends is connected with the power, by a specific power up sequence, a return circuit is firstly constituted between the spark suppression resistor R1 and the energy storage capacitor C1, so as to limit the energy storage capacitor C1 from instantaneously releasing a large current afterwards to avoid appearances of spark phenomenon and protect the connectors and communication circuit connected therewith, which is capable of prolonging the service life of the connectors.

Optionally, connections among the power ground ends PGnd and connections among the signal ends S are established at a same time; or, connections among the power ground ends PGnd are established prior to connections among the signal ends S; so as to avoid the return circuit constituted by the spark suppression resistor R1 and the energy storage capacitor C1 form impacting the signal line to damage the communication circuit.

As shown in FIG. 1, reference number 1 is a plug or a socket; and reference number 2 is the socket or the plug. The power source circuit 3 comprises at least a power source BT1 and an external chip U1. The high-power load circuit 4 comprises at least a high-power load and an external ship U2. The power source circuit 3 and the high-power load circuit 4 can be respectively provided on one cooper clad laminate. The first external ship U1 and the second external chip U2 can be embodied as an MCU chip, but is not limited, can be embodied as other chips with signal processing function. The first external chip U1 and the second external chip U2 achieves electrical connection communication by connections among signal connectors of the plug and the socket. The power source BT1 achieves electrically connecting with the high-power load circuit 3 through connections among the signal connectors of the plug and the socket and provides power for the plug and the socket.

Power source connectors and signal connectors are provided both on the plug and the socket. Understandably, when the plug and the socket are plugged together, the power source connectors of the plug and the socket are matched and connected; and the signal connectors of the plug and the socket are matched and connected. The power source connectors are for connecting the power source BT1 of the power source circuit 3 or the high-power load L of the high-power load circuit 4, for example but is not limited to that, the power source connectors of the plug are connected with the power source of the power source circuit 3, the power source connectors of the socket are connected with the high-power load L of the high-power load circuit 4. The signal connectors are for connecting the first external chip U1 of the power source circuit 3 or the second external chip U2 of the high-power load circuit 4, for example but is not limited to that, the signal connectors of the plug is connected with the first external chip U1 of the high-power load circuit 4, the signal connectors of the socket are connected with the second external chip U2 of the high power load.

When the connectors are coupled, the earlier is the electrical connections among the ends, the shorter is the contact distances among the ends; i.e., when the plug and the socket are plugged, contact distances among the ends which are electrically connected earlier are shorter than contact distances among the ends which are electrically connected later, so as to ensure early and late contacts among the ends to achieve a specific power up sequence. Of course, ends which are electrically connected at a same time have identical contact distances. In a one-time plug process, ends which are connected earlier are contacted earlier; and ends which are connected later are contacted later, which is suitable for the earlier and later connecting manner of ends in the preferred embodiments mentioned above and is not illustrate here in detail.

According to another preferred embodiment of the present invention, ends which are matched for electrical connections comprise a concave end and a convex end, for instance, the plug is a convex end and the socket is a concave end. Optionally, the convex end which is electrically connected earlier has a longer length extended out. The convex end is telescopic. The convex end is compressed when contacts the concave end, so as to make other convex ends contacted with each other one by one. Alternatively, the convex end which is electrically connected earlier has a longer extended length, the concave end is deeper; when the convex end is capable of extending downwards continuously after contacting the concave end, so as to make other concave ends contact each other one by one.

Specifically, the convex ends which are electrically connected earlier has a longer extended length and contact the concave ends of the socket earlier compared with the concave ends which are electrically connected later; wherein the concave ends on the socket can have an identical height; i.e., when the plug process is performed for a half-length, ends which are electrically connected earlier are contacted with each other, and ends which are electrically connected later are not contacted with each other. When the lug process is ended, all ends are contacted with each other. Convex ends with a longer extended length which may have a stretch function, are correspondingly compressed when contact concave ends which are matched, and finally have an identical height with other ends; or have a deeper depth compared with concave ends opposite to convex ends which have a longer extended length and have electrical connection part on a depth direction, so that the convex ends have a longer extended length contact the concave ends from a top portion, and are inserted downwards in a deeper direction by keeping contract until a depth that other ends are all contacted, of course, a deeper depth is also allowed. Of course, there are other manners to achieve the specific power up sequence, so as to ensure that the contact of ends which are electrically connected earlier does not impact the contact of ends which are electrically connected later.

According to another preferred embodiment of the present invention, the power end P+, the power ground end PGnd, the signal end S and the signal ground end SGnd are embedded in or stretched out of the plug or the socket; wherein the plug and the socket are required to be matched and connected without any limitation.

The power ground line of the power connectors and the signal ground line are provided separately, and are no longer on an identical position. In the plug and the socket, the power ground and the signal ground are separated or insulated on the routing line or in distribution. Understandably, the ends are separated from each other as well.

The current break of the high power load current under the conditions of power up or power failure and etc will have an impact on signal communications of the communication ends. There are interferences among the signals and the signals are not capable of being outputted completely or in normal, and the electrical performances are impacted and become unstable. Thus, the plug and the socket which is connected as a power source and the plug and the socket which is connected for communication are provided separately, which causes problems that the plug is not convenient and the plug parts are in a large number and in a mess.

Referring to FIG. 1, the communication circuit comprises an MCU chip U1 of the power source circuit, an MCU chip U2 of the high power load circuit 4 and corresponding connection circuit. A positive end of a power source BT1 of the power source circuit 3 is connected with the power source end P+ of the plug or the socket; and a negative end of the power source BT1 of the power source circuit 3 is connected with the power source ground end SGnd of the plug or the socket. The power source BT1 provides power for the MCU chip U1. The signal end of the MCU chip U1 of the power source circuit 3 is connected with the signal end S of the plug or the socket 1 via a resistor R3. The ground end of the MCU chip U1 of the power source circuit 3 is to connected with the signal ground end PGnd of the plug or the socket 1 and further connected with the negative end of the power source BT1. The signal end of the MCU chip U2 of the high-power load circuit 4 is connected with the signal end of the plug or the socket via the resistor R2; and the ground end thereof is connected with the signal ground end of the plug or the socket 2. A first end of the load L of the high-power load circuit 4 is connected with the power source ground PGnd of the plug or the socket; and a second end thereof is connected with the power source end P+ of the plug or the socket. Optionally, a fuse F1 is connected among the power source ends P+ of the load L, the socket or the plug 2, so as to break the circuit under excessive charges. Optionally, an electric control switch K1 is connected among the power source ends P+ between the load L and the plug or the socket 2, wherein K1 is conducted and switched on/off under control of the MCU chip U2. In the FIG. 1, the spark suppression resistor R1 is connected between the power source ground end SGnd and the power source ground end PGnd of the socket or the plug 2.

Figure 2:
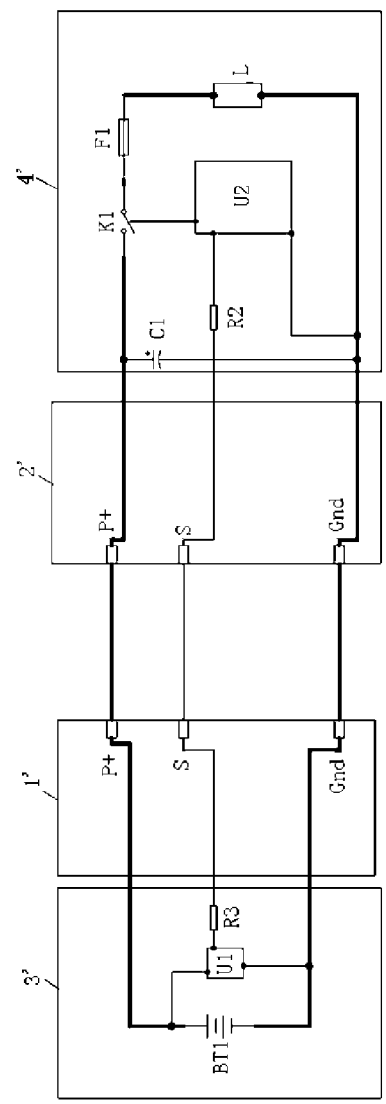
FIG. 2 is a structural sketch view of a power communication electrical connector according to anther preferred embodiment of the present invention.

According to another preferred embodiment of the present invention, referring to FIG. 2, reference number 1' is a plug or a socket, and reference number 2' is the socket or the plug; wherein the plug is connected with a power source circuit 3' and the socket is connected with a high power load circuit 4'; or otherwise, the socket is connected with a power source circuit 3' and the plug is connected with a high power load circuit 4', which has differences compared with the preferred embodiment shown in the FIG. 1 as follows. The power ground line of the power source connectors in the plug and the socket and the signal ground line of the signal connectors are provided in combination, and corresponding ends are combined into one. In other words, only a common ground Gnd is provided in the plug and the socket; and the ground ends of the power source circuit and the high-power load circuit are all connected to the common ground Gnd. The power source connectors and the signal connectors are integrated together, and power source connection and communication connection can be achieved at the same by a one-time plug, and the operation is more convenient.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A power communication electrical connector, comprising: a plug and a socket which are matched and plugged for connecting a power source circuit or a high-power load circuit;
   power source connectors and signal connectors are respectively provided on both the plug and the socket, the power source connectors are for connecting a power source of the power source circuit or a high-power load of the high-power load circuit; the signal connectors are for connecting an external chip of the power source circuit or an external chip of the high-power load circuit; and
   a power ground of the power source connectors and a signal ground of the signal connectors are separately provided;
   wherein the power source connectors comprise a power source end, a power source ground end, a power line and a power ground line which are respectively connected with the power source end and the power source ground end; the signal connectors comprise a signal end, a signal ground end, a signal line and a signal ground line which are respectively connected with the signal end and the signal ground end;
   wherein when the plug and the socket are plugged, connections among the power source ground ends and connections among the signal ground ends are prior to connections among the power source ends and connections among the signal ends.

2. The power communication electrical connector according to claim 1, when the plug and the socket are plugged, connections among the power source ground ends and connections among the signal ground ends are at a same or different time; when the plug and the socket are plugged, connections among the power source ends and connections among the signal ends are at a same or different time.

3. The power communication electrical connector according to claim 1, wherein an energy storage capacitor is connected between the power line and the power ground line; wherein the energy storage capacitor is provided in the plug or the socket; or in the power source circuit or the high-power load circuit.

4. The power communication electrical connector according to claim 3, wherein a spark suppression resistor is connected between the signal ground line and the power ground line; the spark suppression resistor is provided in the plug or the socket; or in the power source circuit or the high-power load circuit.

5. The power communication electrical connector according to claim 4, wherein when the plug and the socket are plugged, connections among the signal ground ends are prior to connections among the power source ends; connections among the power source ends are prior to connections among the power ground ends and the signal ends, in such a manner that after the signal ground ends are connected with each other and the power ground ends are connected with each other, the spark suppression resistor and the energy storage capacitor constitute a return circuit, so as to inhibit the energy storage capacitor from release a heavy current instantaneously.

6. The power communication electrical connector according to claim 5, wherein connections among the power ground ends and connections among the signal ends are at a same time; or connections among the power ground end are prior to connections among the signal ends.

7. The power communication electrical connector according to claim 1, wherein when the plug and the socket are plugged, contact distances among ends which are connected before are shorter than contact distances among ends which are connected afterwards.

8. The power communication electrical connector according to claim 1, wherein the power source ends, the power source ground ends, the signal ends and the signal ground ends are embedded in or extended out of the plug or the socket.

9. An anti-spark power communication electrical connector, comprising: a power source connector and a signal connector; wherein the power source connector comprises a power end, a power ground end, and a power line and a power ground line which are respectively connected with the power end and the power ground end; the signal connector comprises a signal end, a signal ground end, a signal line and a signal ground line which are respectively connected with the signal end and the signal ground end; an energy storage capacitor is connected between the power line and the power ground line; a spark suppression resistor is connected between the signal ground line and the power source ground line; and
   wherein when the connectors are matched or plugged, electrical connections among the signal ground ends are prior to electrical connections among the power ends; electrical connections among the power ends are prior to electrical connections among the power source ground ends and electrical connections among the signal ends, in such a manner that when electrical connections are established among the signal ground ends and among the power source ends, the spark suppression resistor and the energy storage capacitor constitutes a return circuit, so as to inhibit the energy storage capacitor from releasing a large current instantaneously.

10. The anti-spark power communication electrical connector according to claim 9, wherein the electrical connections among the power ground ends and the connections among the signal ends are at a same time; or the connections among the power ground ends are prior to the electrical connections among the signal ends.

11. The anti-spark power communication electrical connector according to claim 9, wherein the power source connector is for connecting an external ship of a power source of a power source or an external chip of a high-power load circuit.

12. The anti-spark power communication electrical connector according to claim 9, wherein more earlier is the electrical connections among ends when the connectors are matched and plugged, more shorter is contact distances among the ends.

13. The anti-spark power communication electrical connector according to claim 12, wherein the ends which are matched and connected comprise a concave end and a convex end; convex end which is firstly electrically connected has a longer extended length; the convex end is telescopic; the convex end is compressed after contacting the concave end, so as to make other convex ends contacted with each other one by one; or, the convex end which is electrically connected has a longer extended length and the concave end is deeper; the convex end is capable of inserting downwards continuously after contacting the concave end, so as to make other convex ends contacted with each other one by one.

14. The anti-spark power communication electrical connector according to claim 9, wherein the connector is the plug which is matched and connected with the socket, or a socket which is matched and connected with the plug; or the plug and the socket which are matched and plugged.

15. The anti-spark power communication electrical connector according to claim 14, wherein the energy storage capacitor is provided in the plug or the socket; or provided in the power source circuit or the high-power load circuit.

16. The anti-spark power communication electrical connector according to claim 14, wherein the spark suppression resistor is provided in the plug or the socket; or provided in the power source circuit or the high-power load circuit.

17. The anti-spark power communication electrical connector according to claim 14, wherein the power end, the power ground end, the signal end, the signal ground end are embedded in or extended out of the plug or the socket.

18. The anti-spark power communication electrical connector according to claim 9, wherein in the connectors, the signal ground line and the power ground line are provided separately.

* * * * *